Feb. 6, 1951 J. A. TOLMAN 2,540,223
STERILIZATION OF LIQUIDS
Filed July 19, 1946
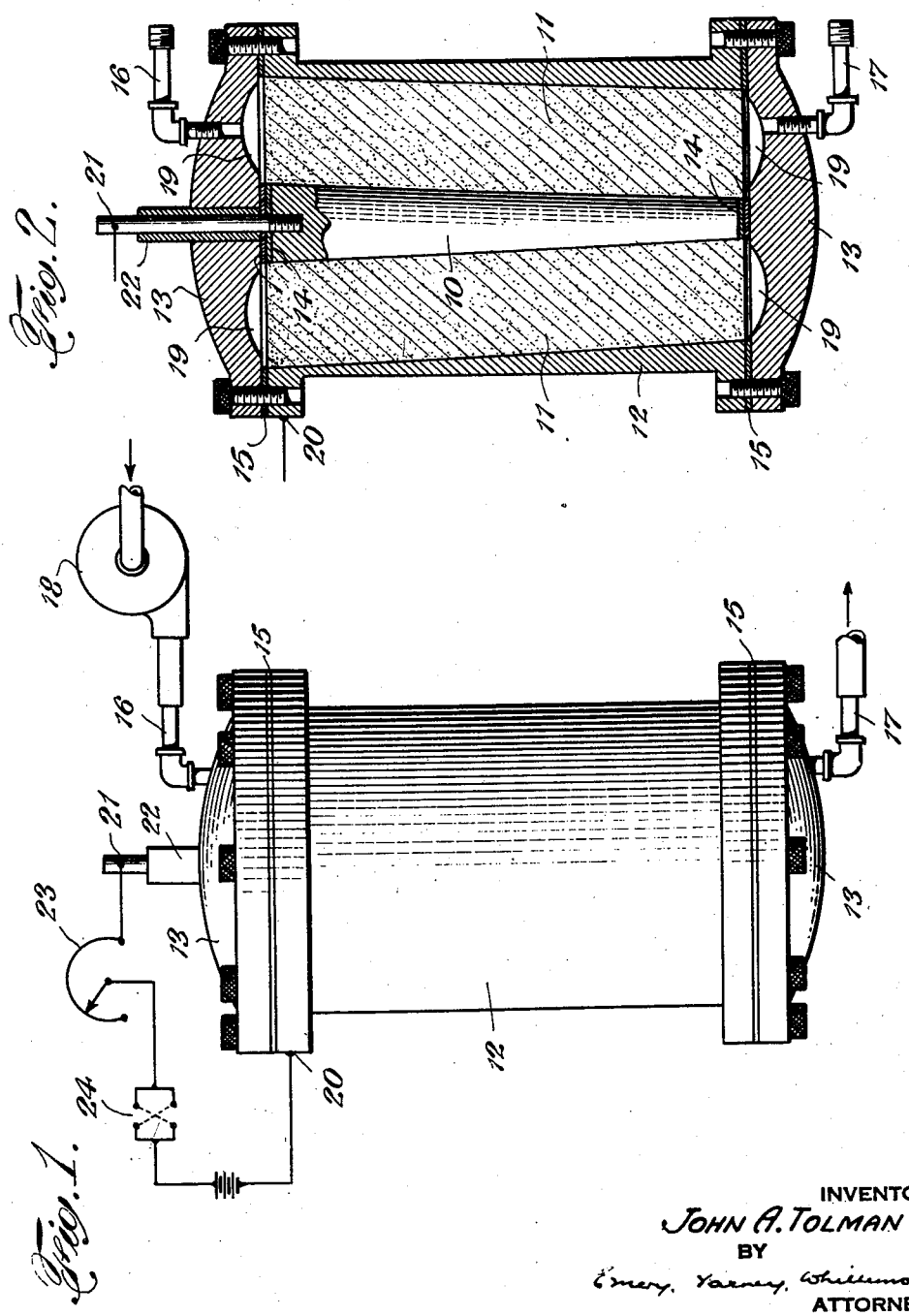
INVENTOR,
JOHN A. TOLMAN
BY
Emery, Varney, Whitmore & Dr.
ATTORNEYS Patented Feb. 6, 1951

2,540,223

UNITED STATES PATENT OFFICE 2,540,223

STERILIZATION OF LIQUIDS

John A. Tolman, Los Angeles, Calif.

Application July 19, 1946, Serial No. 684,680

7 Claims. (Cl. 99—221)

The present invention relates to a method and device for sterilizing, or rendering substantially germ free, liquids containing bacteria. The device is also adapted for mass production of the sterilized product since the operation is carried out while the liquid under treatment flows continuously through it.

One of the important applications of my invention is in the treatment of raw milk so as to make it fit for storage, transportation, and ultimately safe for human consumption. The great advantages attending the use of my invention can perhaps be best appreciated by considering the long-standing commercial practice and thereafter describing my method and apparatus by way of contrast.

The accepted and commercially used method for handling raw milk is to run it through a machine which elevates the temperature of the whole body of the milk to about 158° F., or even higher, and holding the milk at this temperature for a time period of from 30 seconds to several minutes. This produces a germicidal effect on all the pathogenic organisms and inhibits enzyme activity, but does not destroy all bacteria. It requires the application of large amounts of heat because of the high value of the specific heat of the milk and the considerable rise in temperature involved in the process. Not the least of the disadvantages of this method is the characteristic "heat" taste imparted to the product.

With the machine and method of my invention the situation is altogether different. Presently I shall describe a practical machine constructed and operated in accordance with my invention, but now I merely wish to point out that it consumes a small amount of electrical energy, so small that it may be considered negligible as an item of expense; that it does not depend upon elevation of temperature; that the product retains the taste of clean fresh milk; that a practically complete sterilization of the product can be achieved whereby it is possible to transport the same over a long distance without special refrigeration means or store it for an indefinitely long time without harm to the consumer and while retaining the fresh taste.

I am aware that attempts have been made to employ electrical energy in various forms to secure germicidal effects but they have never resulted in practical apparatus for the sterilization of liquids containing bacteria on a mass production basis. One need only cite the universal commercial practice of pasteurizing raw milk by raising its temperature to show that none of these attempts has borne fruit in this field. That my invention is radically different from anything heretofore proposed will become clear from the following description of an apparatus constructed and operated in accordance with my invention.

In the drawings, Fig. 1 is an elevation and Fig. 2 a central vertical section of such an apparatus.

The main body of the device may, for example, consist of three generally cylindrical parts. One part, the core, consists of a tube or spindle 10 of relatively small outside diameter made from good electrically conducting material such as aluminum. A second part, the porous filter 11, has a hole along its axis of such diameter as to provide a tight fit when it is threaded upon the core. For this purpose I have successfully used a commercially available porous carbon filter constructed of a mass of carefully sized carbon particles, bonded with carbon to form a rigid, uniformly porous material in which the pores are interconnected in all directions. The third part, a jacket 12, preferably of the same material as the core, is in the form of a tube having an inside diameter such as to provide a tight fit when threaded upon the filter part. All three parts have approximately the same axial length so that when assembled as indicated the whole comprises a composite cylinder. Since it is important to secure a tight fit between the core and the filter and also between the filter and the jacket I have found it desirable to impart a slight taper to these adjoining surfaces. This taper is also advantageous in disassembling the parts for cleaning or replacement.

In addition to the parts already mentioned I provide two slightly dome-shaped caps 13, one for each end of the composite cylinder, of the same material as the core and jacket. The outer rim of each cap has a flat bearing surface which mates with a flanged surface formed at each end of the jacket. Suitable bolt holes are provided so that the mating surfaces can be tightly bolted together; and for sealing and insulating purposes, gaskets 14, 15 of soft rubber may be provided. Each cap is also provided with a tapped hole for making an external pipe connection. One of the pipes 16 is for supplying raw milk, or other liquid being treated, and the other 17 for leading the treated liquid to a suitable container (not shown). The liquid is forced through the apparatus, for example, by an external pump 18. The dome shape of each cap leaves an open space 19 between the inside surface of the cap and the adjoining end of the filter. When liquid is being forced through, these spaces allow for equalization of the pressure whereby the full cross-section of the filter is utilized. At the same time, the tight fit between the abutting surfaces of the core-filter-jacket assembly prevents liquid from being by-passed around the filter.

In order to supply electrical energy to the device, the core and jacket serve as electrodes. In the form of the apparatus being described, one terminal 20 of a D. C. current is electrically connected to the jacket and the other terminal 21 to the core. In order to prevent a short circuit the core is insulated at 14 and 22 from the jacket and caps except through the filter which is of electrically conducting material. The amount of current flowing is controlled by a rheostat 23 or similar well known means. Macroscopically considered, the current flow between core and jacket in the present device is radial, that is transverse to the direction of the flow of the liquid. Current density is made practically uniform in the axial direction by reason of the fact that the core and jacket have substantially greater electrical conductivity than the filter. Microcopically considered, the current follows a tortuous path since it flows in and on the surface of the carbon body of the filter and practically not at all in the liquid.

I have found from many tests with apparatus constructed as described that the germicidal efficiency depends upon the value of the current, or rather, current density. When the current is very weak, the efficiency is very high. When the current is strong, the efficiency is very low. For example, in an apparatus where the carbon filter had an outside diameter of about 4⅜", an inside diameter of about 1" and an axial length of about 8" very good results were obtained when the current was not more than about 20 milliamperes with liquid passing through at about 75 cc. per minute. For smaller values of current the efficiency was still good, but when the current was increased much above this value, say to 100 milliamperes, there was still a germicidal effect but the efficiency was greatly reduced. The value of the current above which the efficiency decreases is approximately proportional to the volume rate of flow of the liquid. Thus, to summarize, in practising my invention a current density of the order of 1 milliampere per square inch will produce practical results even though a variation from this current density may be necessary to produce the best results in a particular case.

I have also found that the efficiency begins to drop off after about 15 or 20 minutes if the current is made to flow continuously in one direction. However, full efficiency is maintained if the direction of the current flow is reversed every 15 minutes or less. To accomplish this automatically it is a simple matter to include a reversing commutator or switch 24 in the electrical supply circuit.

The figures thus far given have been by way of example and are in terms of total current as well as current density. If the current is expressed in terms of current density the following empirical formula yields a value of the maximum current density which will be satisfactory for units of different sizes and configurations.

$$i = Kv$$

where $i$ is the current density in amperes per square inch, $K$ is a constant equal to $73 \times 10^{-6}$ $v$ is the volume rate of flow in cubic inches per minute In constructions where current density is not uniform throughout the volume of the filter (as in the cylindrical apparatus described) it is sufficiently accurate to consider the current density as applying to a surface halfway between the electrodes.

If it is desired, an optimum value of current may be determined in the following simple manner. Run through the machine at the intended volume rate and at the current value determined from the above formula a liquid consisting of a $1/100$ rennet solution and after waiting for one hour test the treated rennet solution for coagulation time in milk. Samples should be taken at double and one-half this current value and similarly tested for coagulation time. Other values of current may be used depending upon what these tests show. While this refined procedure is not absolutely necessary, it is recommended because of its simplicity and because it establishes once and for all the best current value for a particular apparatus and any other apparatus of the same construction.

While the carbon part of the device has been termed a filter, it should not be inferred that the present invention operates on the principle of a filter. It is true that the porous carbon would filter out suspended foreign matter and this cleaning action is a desirable feature of the construction. However, the main purpose of the porous filter is its great magnification of the interfacial contact between the fluid and carbon surfaces. Although the material need not be carbon, the magnification referred to is essential to the successful operation of my invention. In other words, a very large area of contact should be maintained between the liquid and the filter as compared with the volume of liquid under treatment at any given moment. While the degree of porosity, or magnification of interfacial contact, should be great, there is no critical value. Some idea of the effect of different porosities may be had by considering the following table in which the values were obtained by actual test. Column A is the average pore diameter in inches and Column B is the percent reduction in bacteria count using samples of raw milk treated by the apparatus.

| A | B |
|---|---|
| Inches | Per cent |
| .0013 | 99 |
| .0019 | 95 |
| .0027 | 92 |
| .0039 | 85 |

The device may be constructed in many different ways, providing the features pointed out as essential are included. The materials in any given construction should be such that they are relatively inactive in a chemical sense, particularly where they come in contact with the liquid being treated. I have, for example, used semiconducting porous rubber in place of the carbon filter with entirely satisfactory results. It was necessary only to employ a sufficiently higher voltage in the source of electrical energy to produce in the porous rubber current densities of the same order as described for the porous carbon owing to the greater resistivity of the former. I have also found, in the case of the carbon filter type, that when the carbon portion of the device is subjected to a red heat before assembling into the completed unit satisfactory operation can be had without an external source of electrical energy. It appears that after the filter is dampened by the liquid the whole assembly behaves like a voltaic cell. Sufficient current density is secured by using the unit as its own source of energy, the circuit being completed externally between core and jacket either through a short-circuiting wire or a nominal value of resistance.

I claim as my invention:

1. A method of treating liquids to destroy bacteria suspended therein which comprises flowing the liquid while in contact with a solid porous current-conducting body providing a continuous electric path through which a direct electric current is passed and maintaining a very large area of interfacial contact between the liquid and said body as compared with the volume of liquid under treatment at a given moment, the average density of said current being of the order of 1 milliampere per square inch.

2. A device for sterilizing liquids comprising a solid porous filter of a material having a high degree of electrical conductivity as compared to the liquid being treated, and electrodes so attached directly to said filter as to pass current through all parts thereof when connected to a source of electrical energy.

3. A device for sterilizing liquids comprising a solid porous filter of a material having much greater electrical conductivity than the liquid being treated, electrodes so attached directly to said filter as to pass current through all parts thereof when connected to a source of electrical energy, and means to force a liquid through said filter.

4. The device of claim 3 in which the solid porous filter is of carbon or contains carbon particles.

5. The device of claim 3 in which one of the electrodes comprises a jacket within which the filter is disposed and the other electrode a core passing through the filter.

6. An apparatus for sterilizing liquids comprising an outer cylindrical metallic casing, a solid porous body of electrically conducting material within the jacket tightly fitted to the interior wall thereof and electrically connected thereto, a central metallic core tightly fitted within the porous body and electrically connected thereto, end caps tightly fitted to the respective ends of the casing and forming spaces between their inside surfaces and the respective ends of the porous body, an intake for liquid communicating with one of said spaces, and an outlet for the liquid communicating with the other of said spaces.

7. A method of treating raw milk to destroy bacteria suspended therein which comprises flowing the milk through a solid porous current-conducting body and simultaneously passing through said body electric current having an average current density in amperes per square inch of said body equal to $73 \times 10^{-6}$ times the volume rate of flow of milk in cubic inches per minute.

JOHN A. TOLMAN.

REFERENCES CITED

The following references are of record in the file of this patent:

UNITED STATES PATENTS

| Number | Name | Date |
|---|---|---|
| 1,035,777 | Bullock | Aug. 13, 1912 |
| 1,162,213 | Bloom | Nov. 30, 1915 |
| 1,984,956 | Anglim | Dec. 18, 1934 |
| 2,086,324 | Feremutsch | July 6, 1937 |
| 2,109,151 | Krause | Feb. 22, 1938 |